(12) United States Patent
Holliman

(10) Patent No.: US 7,983,477 B2
(45) Date of Patent: Jul. 19, 2011

(54) METHOD AND APPARATUS FOR GENERATING A STEREOSCOPIC IMAGE

(75) Inventor: Nicolas Steven Holliman, Durham (GB)

(73) Assignee: The University of Durham (GB)

(*) Notice: Subject to any disclaimer, the term of this patent is extended or adjusted under 35 U.S.C. 154(b) by 0 days.

(21) Appl. No.: 12/497,537

(22) Filed: Jul. 2, 2009

(65) Prior Publication Data
US 2009/0268014 A1    Oct. 29, 2009

Related U.S. Application Data

(63) Continuation of application No. 10/596,536, filed on Sep. 14, 2006, now Pat. No. 7,557,824.

(51) Int. Cl.
*H04N 13/00* (2006.01)
*G06K 9/40* (2006.01)

(52) U.S. Cl. ............... 382/154; 348/47; 348/46; 348/51; 382/128

(58) Field of Classification Search .................. 382/128, 382/106, 285, 154, 277; 345/419–627; 348/46, 348/51, 50, 42, 699, 575
See application file for complete search history.

(56) References Cited

U.S. PATENT DOCUMENTS

| | | | |
|---|---|---|---|
| 4,134,644 A | 1/1979 | Marks et al. | |
| 4,281,341 A | 7/1981 | Byatt | |
| 4,620,770 A | 11/1986 | Wexler | |
| 4,692,792 A | 9/1987 | Street | |
| 4,719,507 A | 1/1988 | Bos | |
| 4,995,718 A | 2/1991 | Jachimowicz et al. | |
| 5,260,729 A | 11/1993 | Ullah et al. | |
| 5,537,476 A | 7/1996 | Coteus et al. | |
| 5,543,964 A | 8/1996 | Taylor et al. | |
| 5,564,810 A | 10/1996 | Larson | |
| 5,856,829 A | 1/1999 | Gray et al. | |
| 5,963,371 A | 10/1999 | Needham et al. | |
| 6,252,570 B1 | 6/2001 | Mangerson et al. | |
| 6,313,866 B1 * | 11/2001 | Akamatsu et al. | 348/51 |
| 6,377,625 B1 | 4/2002 | Kim | |
| 6,392,689 B1 | 5/2002 | Dolgoff | |
| 6,449,005 B1 | 9/2002 | Faris | |

(Continued)

FOREIGN PATENT DOCUMENTS

JP    EP1089573    * 9/1999

OTHER PUBLICATIONS

Sluyterman et al., 18.2: Architectural Choices in a Scanning Backlight for Large LCD TV's, SID 05 Digest, pp. 996-999 (2005).

(Continued)

*Primary Examiner* — Daniel G Mariam
*Assistant Examiner* — Nancy Bitar
(74) *Attorney, Agent, or Firm* — Baker & McKenzie LLP

(57) ABSTRACT

A method of generating a stereoscopic image is disclosed. The method includes defining at least two, three or more regions in a scene representing a region of interest, a near regions and/or a far region. This is followed by forming an image pair for each region, this image pair containing the information relating to objects in or partially in their respective region. The perceived depth within the regions is altered to provide the idea or best perceived depth within the region of interest and acceptable or more compressed perceived depths in the other regions. The image pairs are then mapped together to form a display image pair for viewing on a display device.

29 Claims, 10 Drawing Sheets

U.S. PATENT DOCUMENTS

| | | | |
|---|---|---|---|
| 6,608,614 B1 | 8/2003 | Johnson | |
| 6,680,578 B2 | 1/2004 | Antoniadis et al. | |
| 6,698,890 B1 | 3/2004 | Jorke | |
| 6,798,406 B1 | 9/2004 | Jones et al. | |
| 6,823,080 B2 * | 11/2004 | Iijima et al. | 382/154 |
| 6,829,393 B2 | 12/2004 | Jansson | |
| 6,888,529 B2 | 5/2005 | Bruning et al. | |
| 6,911,963 B2 | 6/2005 | Baba et al. | |
| 6,956,964 B2 | 10/2005 | Lee et al. | |
| 6,975,345 B1 | 12/2005 | Lipton et al. | |
| 6,975,369 B1 | 12/2005 | Burkholder | |
| 6,980,177 B2 | 12/2005 | Struyk | |
| 7,002,546 B1 | 2/2006 | Stuppi et al. | |
| 7,002,619 B1 | 2/2006 | Dean et al. | |
| 7,403,201 B2 * | 7/2008 | Takemoto et al. | 345/419 |
| 7,557,824 B2 * | 7/2009 | Holliman | 348/46 |
| 7,646,907 B2 * | 1/2010 | Mashitani et al. | 382/154 |
| 7,747,151 B2 * | 6/2010 | Kochi et al. | 396/55 |
| 7,873,207 B2 * | 1/2011 | Tsubaki | 382/154 |
| 2001/0045979 A1 * | 11/2001 | Matsumoto et al. | 348/43 |
| 2002/0118275 A1 | 8/2002 | Harman et al. | |
| 2004/0135754 A1 | 7/2004 | Conner et al. | |
| 2005/0007516 A1 | 1/2005 | Hong et al. | |
| 2005/0094267 A1 | 5/2005 | Huber | |
| 2005/0225630 A1 | 10/2005 | Childers et al. | |
| 2006/0007110 A1 | 1/2006 | Hung et al. | |

OTHER PUBLICATIONS

Folkerts, Wiep, 41.3: Invited Paper: LED Backlighting Concepts with High Flux LED's, SID 04 Digest, pp. 1226-1229 (2004).

Ito et al., 17.3: OCB-WV Film for Fast-Response-Time and Wide-Viewing-Angle LCD TV's, SID 05 Digest, pp. 986-989 (2005).

Jak et al., 25.3: Spectrum Sequential Liquid Crystal Display, SID 05 Digest, pp. 1120-1123 (2005).

Ohtsuki et al., 40.5L: Late-News Paper: 18.1-inch XGA TFT-LCD with Wide Color Reproduction using Hgh Power LED-Backlighting, SID 02 Digest, pp. 1154-1157 (2002).

Sugiura et al., 41.4: Late-News Paper: Wide Color Gamut and High Brightness Assured by the Support of LED Backlighting in WUXGA LCD Monitor, SID 04 Digest, pp. 1230-1231 (2004).

Sakai et al., 41.1: A Thin LED Backlight System with High Efficiency for Backlighting 22-in. TFT-LCD's, SID 04 Digest, pp. 1218-1221 (2004).

Zwanenburg et al., 41.2: High-efficiency LEDs for LCD Backlights, SID 04 Digest, pp. 1222-1225 (2004).

Perduijn et al., 43.2: Light Output Feedback Solution for RGB LED Backlight Applications, SID 03 Digest, pp. 1254-1257 (2003).

Sugiura et al., 25.4: Six-Primary-Color 23-in WXGA LCD using Six-Color LEDs, SID 05 Digest, pp. 1124-1127 (2005).

Lee et al., 40.1: Distinguished Contributed Paper: Integrated Amorphous Silicon Color Sensor on LCD Panel for LED Backlight Feedback Control System, SID 05 Digest, pp. 1376-1379 (2005).

Konno et al., 40.2: RGB Color Control System for LED Backlights in IPS-LCD TVs, SID 05 Digest, pp. 1380-1383 (2005).

Lipton et al., An Improved BYATT Modulator, SPIE vol. 3295, pp. 121-126 (1998).

Sugiura et al., 43.5L: Late News paper: Prototype of a Wide Gamut Monitor Adopting an LED-Backlighting LCD Panel, SID 03 Digest, pp. 1266-1269 (2003).

West et al., 43.4 High Brightness Direct LED Backlight for LCD-TV, SID 03 Digest, pp. 1262-1265 (2003).

Taira et al., 43.1: Color Filterless Liquid Crystal Display Illuminated with LEDs, SID 03 Digest, pp. 1250-1253 (2003).

Martynov et al., 43.3: High-efficiency Slim LED Backlight System with Mixing Light Guide, SID 03 Digest, pp. 1259-1261 (2003).

Nesterenko et al., 40.4: Design and Analysis of Tapered Waveguides as Collimators for LED Backlighting, SID 05 Digest, pp. 1388-1391 (2005).

Cheng, Wayne, 40.3: Power Minimization of LED Backlight in a Color Sequential Display, SID 05 Digest, pp. 1384-1387 (2005).

Roosendaal, 25.2: A Wide Gamut, High Aperture Mobile Spectrum Sequential Liquid Crystal Display, SID 05 Digest, pp. 1116-1119 (2005).

International Search Report for PCT/GB2004/005370 dated Dec. 17, 2004.

European Examination Report for EP 04806168.3 dated Feb. 7, 2008.

* cited by examiner

METHOD AND APPARATUS FOR GENERATING A STEREOSCOPIC IMAGE

CROSS-REFERENCE TO RELATED APPLICATIONS

This application is a continuation of U.S. patent application Ser. No. 10/596,536 entitled "Method and Apparatus for Generating a Stereoscopic Image" filed on Sep. 14, 2006, the entirety of which is incorporated herein by reference.

BACKGROUND

1. Technical Field

The present invention relates to a method for generating a stereoscopic image, computer program for applying such a method, to apparatus for generating a stereoscopic image and to a stereoscopic image, and relates particularly, but not exclusively, to the generation of stereoscopic images on 3D displays for computers.

2. Description of the Related Art

The use of high quality desk top auto-stereoscopic 3D displays, such as that provided by the Sharp Corporation, and described in "Controlling perceived depth in stereoscopic images" (in *Stereoscopic displays and virtual reality systems VIII, precedings of SPIE* 4297A, 2001) are well known. Such devices have a limited perceived depth range, the distance in front of and behind the screen that the viewer perceives that a displayed object extends. This might typically be as little as 55 mm in front of the display surface and 60 mm behind the display surface. This means that any object presented in a stereoscopic view cannot be comfortably perceived to extend further in front of or behind the display surface than these distances.

If the depth of the scene, the distance from the front to the back of the scene on which the stereoscopic image is based, is greater than the available display perceived depth range, this will result in compression of the perceived depth. Consequently, the objects displayed become distorted, their depth becomes compressed, and do not accurately represent the scene. An example of this compression is schematically shown in FIG. 1. It should be noted that scenes are very often scaled to fit the display device. For example, if a galaxy is displayed on a 3-D display device this must be scaled to fit the display and as a result the scene depth is also scaled. However, this scaled scene depth may still be greater than the perceived depth range of the display device. If the scene is scaled so that the scaled scene depth matches the perceived depth range, the scene may be displayed so small as to be of little use.

Alternatively, if the scene depth range to perceived depth range ratio is maintained, so that the objects being viewed do not become distorted or too small, the objects outside the perceived depth range cannot be easily viewed on the display device. It is therefore difficult to create high quality images of three dimensional scenes with significant scene depth, that is with objects in the close foreground and distant background, for example landscape scenes, causing the viewer to be unable to view the scene as a whole.

Preferred embodiments of the present invention seek to overcome disadvantages of the prior art.

According to a first aspect of the present invention there is provided a method of generating a stereoscopic image of a scene, the method comprising:

defining at least one first region of a scene;

forming at least one first image pair, wherein the or each said first image pair comprises a first image of at least a part of a said first region of said scene when viewed from a first location, and a second image of at least a part of said first region when viewed from a second location, spaced from said first location;

carrying out a first mapping process on at least one said first image pair to generate a respective first part of a display image pair;

defining at least one second region of said scene;

forming at least one second image pair, wherein the or each said second image pair comprises a third image of at least a part of a said second region of said scene when viewed from a third location, and a fourth image of at least a part of said second region when viewed from a fourth location, spaced from said third location;

carrying out a second mapping process on at least one said second image pair to generate a respective second part of said display image pair;

and combining the or each first and second part of said display image pairs to form said display image pair, said display image pair being adapted to provide a stereoscopic image of said first and second regions of said scene;

wherein an object having a predetermined depth in a viewing direction in a said first region has a first perceived depth and an object having said predetermined depth in a viewing direction in a said second region has a second perceived depth, different from said first perceived depth, when said stereoscopic image is viewed in stereo.

By providing a method for generating a stereoscopic image in which an object of a predetermined depth is reproduced in the first region having a first perceived depth and in the second having a second perceived depth different from the first perceived depth, in other words the perceived depth range in the first region is different from that in the second region, various advantages are provided. For example, where the first region contains subject matter of particular interest the ratio of perceived depth in the stereoscopic image to actual scene depth from the scene can be maintained at an optimum viewing ratio whilst this ratio in the other regions, typically the near or far regions, can be distorted in order to allow objects in the or these regions to be displayed comfortably. As a result, where the actual scene depth is too great to be accommodated by the perceived depth on the stereoscopic display, the whole scene can be accommodated within the working scene depth of the stereoscopic display device whilst not causing distortion of the actual scene depth to perceived scene depth ratio in the region of interest. This method produces stereoscopic images which can reproduce scene depths beyond the capabilities of the display device whilst allowing them to be easily and comfortably perceived by the viewer. Surprisingly the distortions in perceived depth in the near and far regions produce an image significantly better for the viewer when compared to the viewers discomfort in attempting to view an image with elements extending outside of the comfortable perceived depth range.

For example, where a computer game uses a stereoscopic display and creates a scene having a considerable scene depth, the region in which the action of the game is taking place, the region of interest, can be maintained at the ideal actual scene depth to perceived scene depth ratio. At the same time the near and/or far regions of the scene can be allowed to have distorted actual scene depth to perceived scene depth ratios since these regions will not be the focus of attention of the viewer or game player. The near and far regions may contain information which merely acts as an indication of objects about to enter the region of interest and therefore some distortion of these objects is acceptable to the viewer. Such distortions are more acceptable than making the stereoscopic image uncomfortable to view in particular where the stereoscopic images in question may be viewed for considerable periods of time.

The method may further comprise:
defining at least one third region of said scene;
forming at least one third image pair, wherein the or each said third image pair comprises a fifth image of at least a part of a said third region of said scene when viewed from a fifth location, and a sixth image of at least a part of said third region when viewed from a sixth location, spaced from said fifth location;
carrying out a third mapping process on at least one said third image pair to generate a respective third part of said display image pair; and
combining the or each third part of said display image pair with the or each first and second part of said display image pairs to form said display image pair, said display image pair being adapted to provide a stereoscopic image of said first, second and third regions of said scene;
wherein an object having said predetermined depth in a viewing direction in a said third region has a third perceived depth different from at least said first perceived depth, when said stereoscopic image is viewed in stereo.

By providing three regions of a scene, the advantage is provided that both near and far regions around a region of interest can be provided.

In a preferred embodiment the scene is real.

In a preferred embodiment said locations are located in a plane and preferably each region is defined by its distance from at least one said location.

In a preferred embodiment the perceived depth in each region is determined by the distance between the locations from which the respective image pairs are viewed.

The method may further comprise dividing the image pairs into a plurality of image pair elements and determining the distance in the scene of each element from a position between the respective locations from which the image pair was viewed to determine which region that element is in.

The method may also further comprise discarding elements from image pairs which are not from their respective regions.

According to another aspect of the present invention there is provided a computing program adapted to carry out a method as defined above.

According to a further aspect of the present invention there is provided an apparatus for generating a stereoscopic image of a scene, the apparatus comprising:
at least one first image forming device for forming at least one first image pair, wherein the or each said first image pair comprises a first image of at least a part of a first region of said scene when viewed from a first location, and a second image of at least a part of said first region when viewed from a second location, spaced from said first location;
at least one first mapping device for carrying out a first mapping process on at least one said first image pair to generate a respective first part of a display image pair;
at least one second image forming device for forming at least one second image pair, wherein the or each said second image pair comprises a third image of at least a part of a second region of said scene when viewed from a third location, and a fourth image of at least a part of said second region when viewed from a fourth location, spaced from said third location; and
at least one second mapping device for carrying out a second mapping process on at least one said second image pair to generate a respective second part of said display image pair;
at least one first image combining device for combining the or each first and second part of said display image pairs to form said display image pair, said display image pair being adapted to provide a stereoscopic image of said first and second regions of said scene;
wherein an object having a predetermined depth in a viewing direction in a said first region has a first perceived depth and an object having said predetermined depth in a viewing direction in a said second region has a second perceived depth, different from said first perceived depth, when said stereoscopic image is viewed in stereo.

The apparatus may further comprise:
at least one third image forming device for forming at least one third image pair, wherein the or each said third image pair comprises a fifth image of at least a part of a third region of said scene when viewed from a fifth location, and a sixth image of at least a part of said third region when viewed from a sixth location, spaced from said fifth location;
at least one third mapping device for carrying out a third mapping process on at least one said third image pair to generate a respective third part of said display image pair; and
at least one second image combining device for combining the or each third part of said display image pair with the or each first and second part of said display image pairs to form said display image pair, said display image pair being adapted to provide a stereoscopic image of said first, second and third regions of said scene;
wherein an object having said predetermined depth in a viewing direction in a said third region has a third perceived depth different from at least said first perceived depth, when said stereoscopic image is viewed in stereo.

In a preferred embodiment the scene is real and preferably at least one said image forming device comprises a camera.

In another preferred embodiment at least one said mapping device and at least one said imaging combining device comprise a computing device.

In a further preferred embodiment the scene is simulated and preferably at least one said image forming device, at least one said mapping device and at least one said imaging combining device comprise a computing device.

According to an aspect of the present invention there is provided a stereoscopic image comprising at least one display image pair having at least one first part representing at least one first region of a scene and at least one second part representing at least one second region of said scene, wherein when at least one said display pair are viewed in stereo an object having a predetermined depth in a viewing direction in a said first region has a first perceived depth and an object having said predetermined depth in a viewing direction in a said second region has a second perceived depth, different from said first perceived depth.

According to a further aspect of the present invention there is provided a method of generating a stereoscopic image of a scene, the method comprising:
defining at least one first and at least one second region of a scene;
generating at least one stereoscopic image of said first and second regions of said scene wherein an object having a predetermined depth in a viewing direction in a said first region has a first perceived depth and an object having said predetermined depth in a viewing direction in a said second region has a second perceived depth, different from said first perceived depth, when said stereoscopic image is viewed in stereo.

BRIEF DESCRIPTION OF THE DRAWINGS

Preferred embodiments of the invention will now be described, by way of example only, and not in any limitative sense, with reference to the accompanying drawings in which:

FIG. 3 is a series of stereoscopic images of an embodiment of the present invention in which FIG. 3a shows the far region, FIG. 3b shows the region of interest, FIG. 3c shows the near region and FIG. 3d shows a combination of the three regions to form a stereoscopic image display pair;

Referring to FIGS. 2, 3 and 10, a scene 12 is defined (step S1) and is divided into a first region, or region of interest 14, a second region, or near region 16, and a third region, or far region, 18 (step S2). The scene 12 is viewed from first and second viewing locations 20 and 22 which are located in a viewing plane 24. The boundaries 26, 28, 30 and 32 of regions 14, 16 and 18 are determined by their distance from the viewing plane 24. A first image pair 34 is formed from a first image 36 and a second image 38 (steps S4 and S5). First image 36 is formed by viewing at least part of the first region or region of interest 14 from the first viewing location 20. The second image 38 is formed by viewing at least part of region of interest 14 from second location 22.

Figure 1:
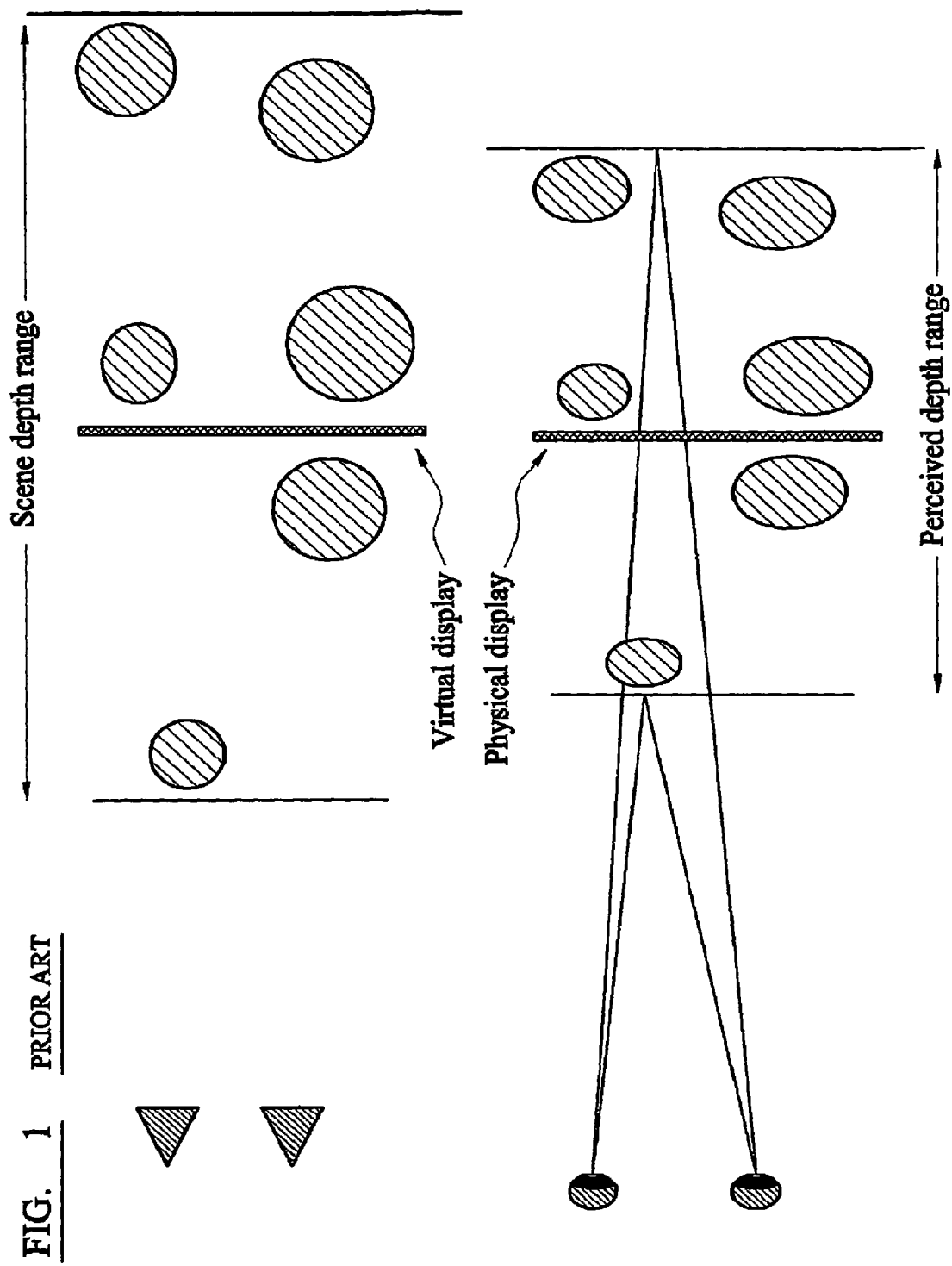
FIG. 1 is a schematic representation showing the difference between scene depth range and perceived depth range in the prior art.
Figure 2:
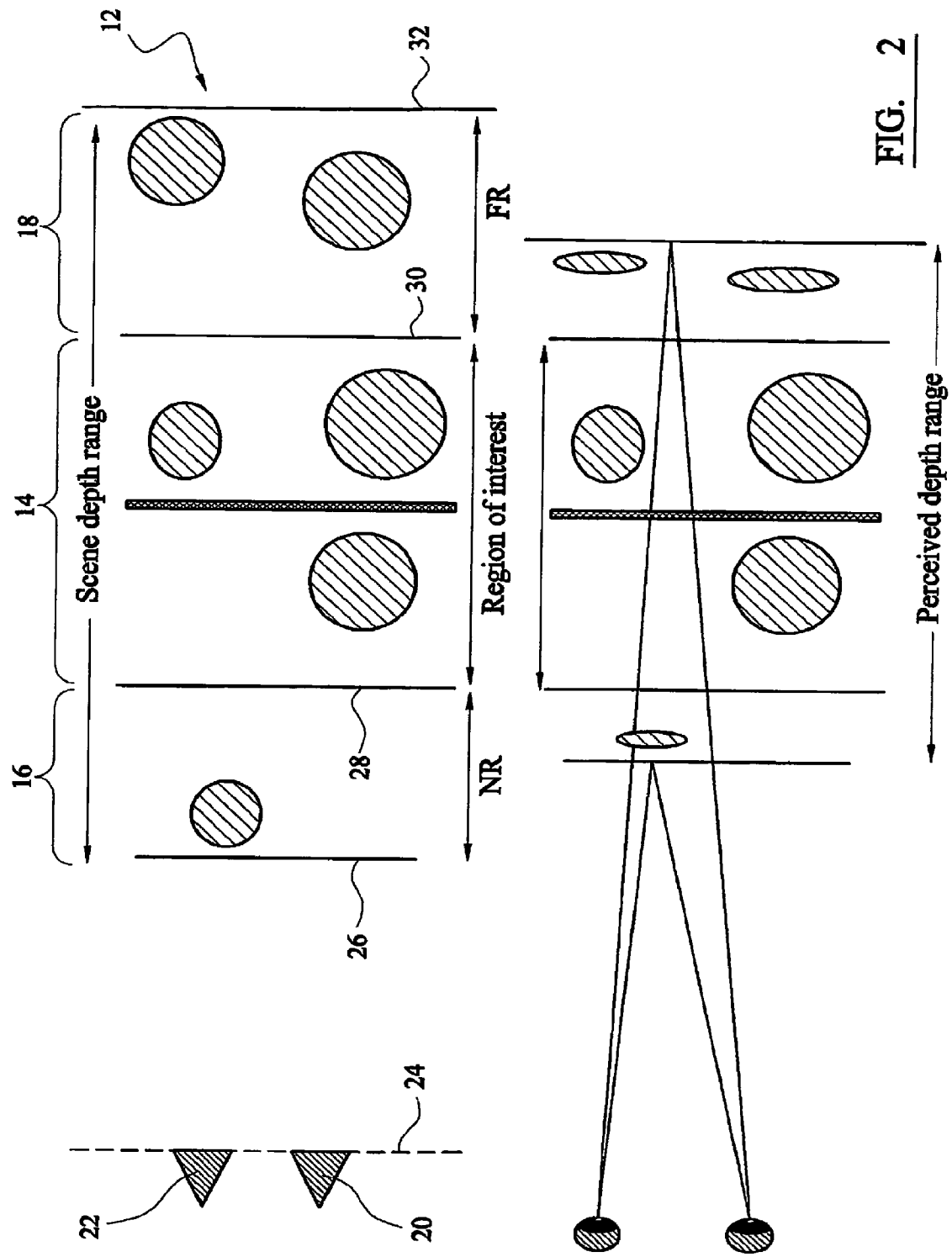
FIG. 2 is a schematic view of the scene depth range and perceived depth range of an embodiment of the present invention.
Figures 3, 3A, 3B, 3C, 3D:
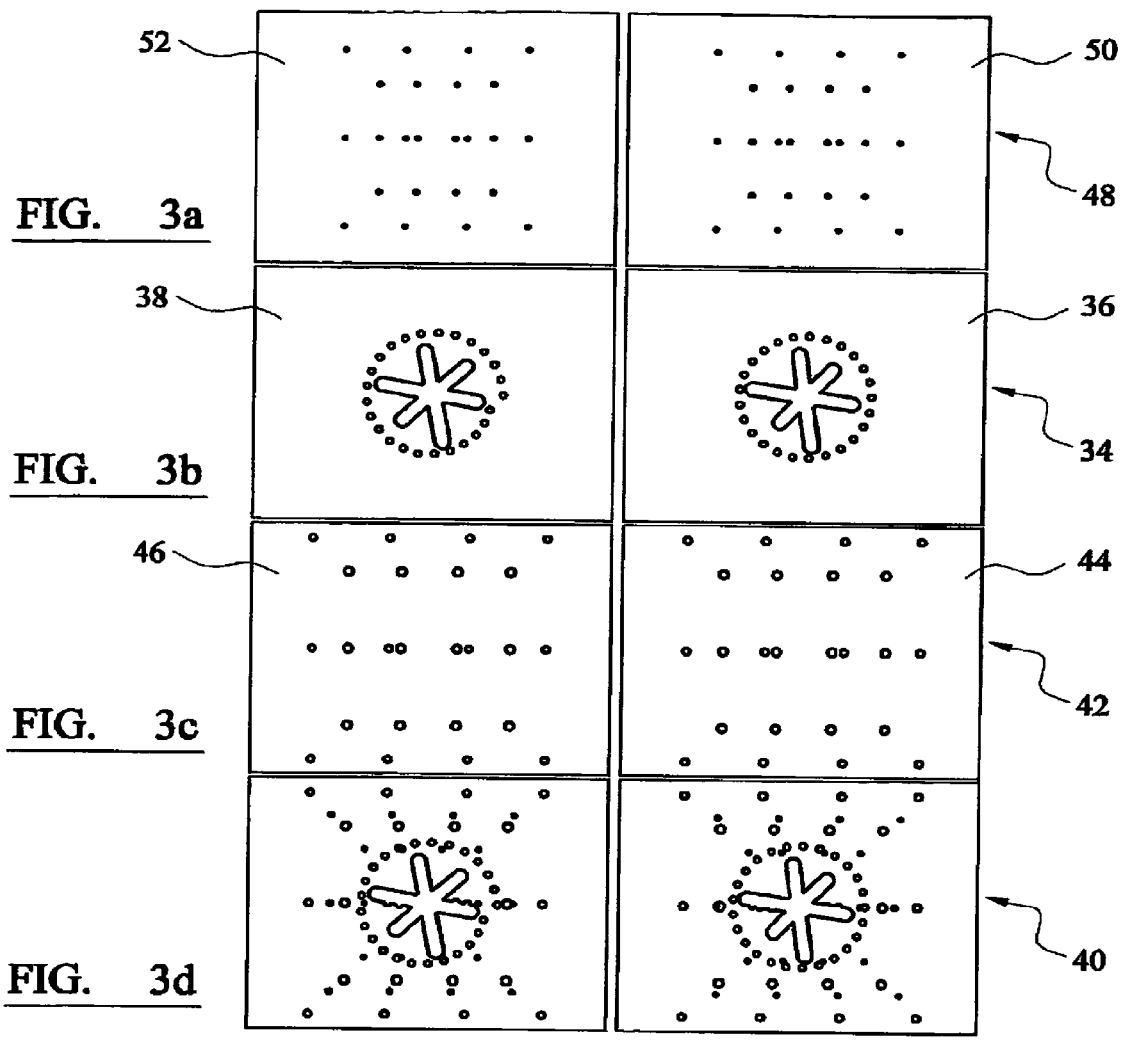

First image pair 34 are mapped to generate a first part of a display image pair 40 (step S6). This process includes clipping the image removing portions of first image pair 34 where the distance from the viewing plane 24 of any portion of the image does not fall within the boundaries 28 and 30 of region of interest 14. The distance between the first viewing location 20 and second viewing location 22 is chosen (see calculations below) in order that the geometric perceived depths as displayed on the display device is the same, or is scaled so as to appear the same for the size of the display device used, as the scene depth range in the region of interest of the actual scene (step S3). As a result, any objects displayed within the region of interest do not appear to be distorted, that is compressed in the dimension extending in front and behind the display device. Where the scene is a synthetic scene, that is an entirely computer-generated scene and not one including any real images, the clipping of the image takes place before it is formed. This is done by restricting the geometry that is used to generate the image to that which lies within the region being mapped. Thus the generated image will be limited to those elements, or parts of elements, falling within the region being mapped. This saves time by only generating data which is needed and not all of the data for the whole image and then removing the data representing parts which are not required. As a result, for synthetic scenes step S6 would normally be between steps S3 and S4.

Figure 6:
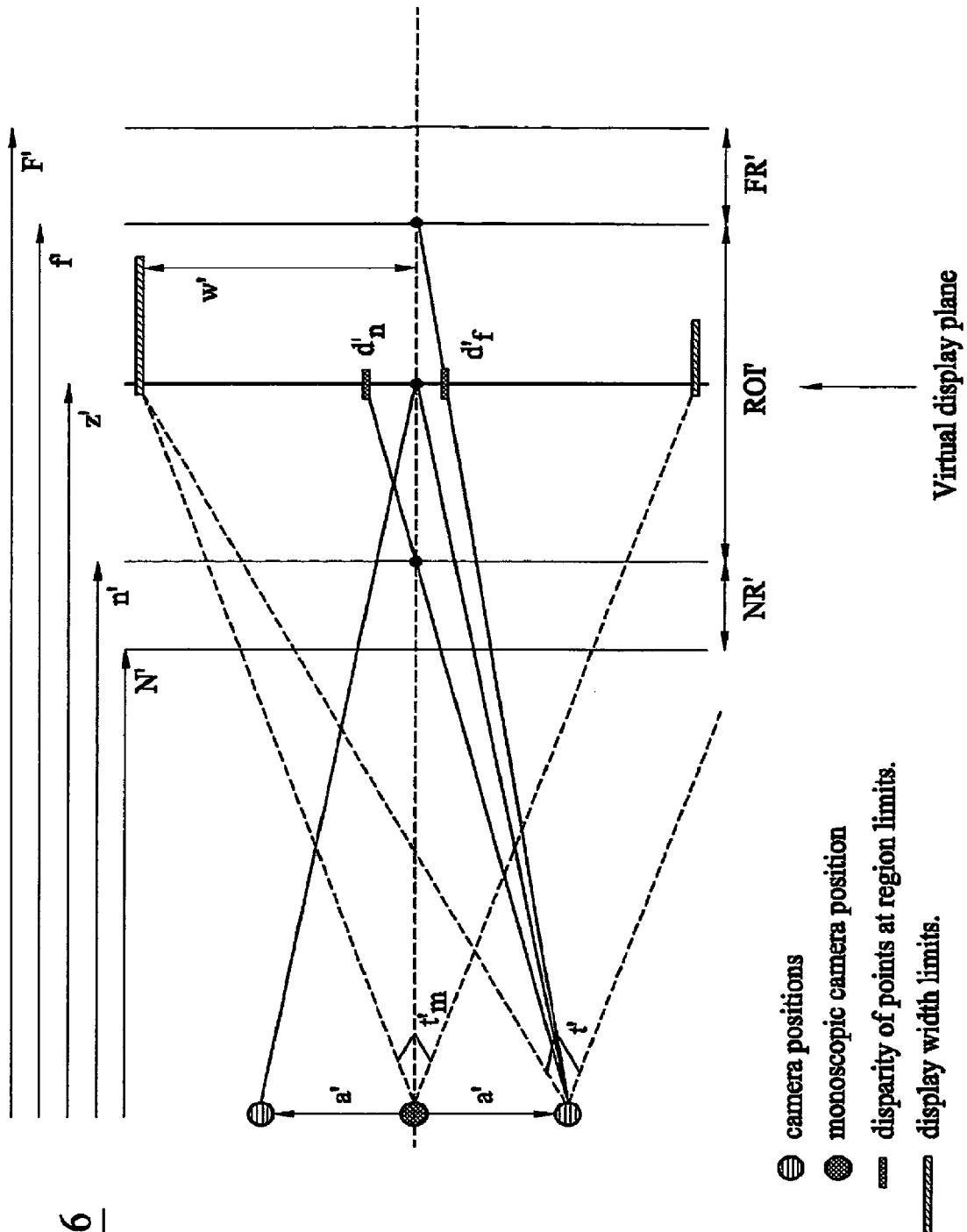
FIG. 6 is a schematic view of the geometry of the present invention showing the near region, region of interest and far regions and monoscopic camera position.

In order to produce a second part 42 of display image pair 40 representing the second or near region 16, a second image pair are formed. The second image pair comprise a third image 44 which consists of at least part of the second region 16 of scene 12 as viewed from a third location. A fourth image 46, the other part of the second image pair, consists of at least part of the second region 16 as viewed from a fourth viewing location. The distance between the first and second viewing locations 20 and 22 is different from the distance between the third and fourth viewing locations. However, all four viewing locations are located within viewing plane 24. The first and second viewing locations and third and fourth viewing locations are generally located equidistant from a central position between the viewing locations which remains the same for the production of the part image pairs for each region. This central position is known as the monoscopic camera position and is shown in FIG. 6. The monoscopic position can move on head-tracked or multi-view displays and the viewing locations will move with it.

Once third and fourth images 44 and 46 have been produced these are mapped using a second mapping process, which may be substantially the same as to the first mapping process, to produce a second part of said display image pair 42. In the second mapping process only parts of the third and fourth images which are within the second or near region 16 are retained within the second part 42 of image display pair 40. For real scene images produced using a digital stereoscopic camera, the portions of the third and fourth images 44 and 46 that are used are individual pixels and distance measuring apparatus, for example the Konica Minolta VI-9i Laser Scanner or the Reigl LIDAR Long-Range Airborne Laser Scanner LMS-Q280 are used to measure the distance from the viewing location to the object that is represented by that pixel and this pixel is used or not within the third or fourth images 44 and 46, depending upon the distance of the object that pixel reproduces from the viewing locations.

A third part 48 of image display pair 40 is produced from a fifth image 50 and sixth image 52. These images represent the third or far region 18 of scene 12 and are produced by viewing from fifth and sixth viewing locations which are located in viewing plane 24 and are a different distance apart from the first and second viewing locations 20 and 22. It should be noted that the distance between the viewing locations can be the same for the near and far regions resulting in the same depth mapping for these regions but this distance must be different from the distance between the viewing locations for the region of interest. Furthermore, in a dynamic system, where the position of the region of interest moves within the scene and/or the overall depth of scene changes, it is possible that the depth mapping of all the regions could be the same. In this case all of the pairs of viewing locations for the regions would converge to the same pair of points.

Having produced the first part 34 of image pair 40 representing the region of interest 14, the second part 42 of image pair 40, representing the near region 42 and the third part 48 of image pair 40 representing the far region, these parts 34, 42 and 48 are combined to form the display image pair 40. This is done by overlaying one image on top of the other starting with the part 42 representing the far region, followed by the part 34 representing the region of interest 14 and finally the part 48 representing the near region 16. When the first part 34 representing the region of interest 14 is overlaid over the third part 48 representing the far region 18, the sections of the first part 34 which do not contain objects within the region of interest 14 are not displayed so that when the first part is overlaid the sections of third part 48, showing objects in the far region 18, that are not obscured by objects in the region of interest 14 can be seen. The same is the case when the second part 42, representing the near region 16, is overlaid on the first part 34.

The display image pair 40 is displayed on an image display device such as a computer screen but may also be viewed through other devices known to the skilled person for example a stereo slide projector using polarisation to allow viewers with polarizing glasses to view the images, hand-held stereo slide viewers such as LuxVue, anaglyph glasses, lenticular prints or free viewing of side-by-side images. The images maybe captured using a real camera or alternatively may be computer-generated scenes simulating real or imaginary scenes. A POV-Ray tracing system may be used to generate such images. To utilise the POV-Ray scripts an operator defines a monoscopic camera position and field of view to frame the scene they wish to generate. They provide details of the target display including the proportion of the total available geometric perceived depth to be used for the far region, region of interest and near region. In addition, the total scene depth and the proportions to be mapped to each region are specified.

Given the above information, a script is run to analyse the depth range in the scene and calculate the stereoscopic camera parameters for the three regions. It is possible that when rendering the near region, region of interest and far region to only use the scene geometry within each region so that the script also calculates the clipping volumes. The resulting scripts are run to generate the left and right images three parts 34, 42 and 48 of the display image pair.

Figure 4:
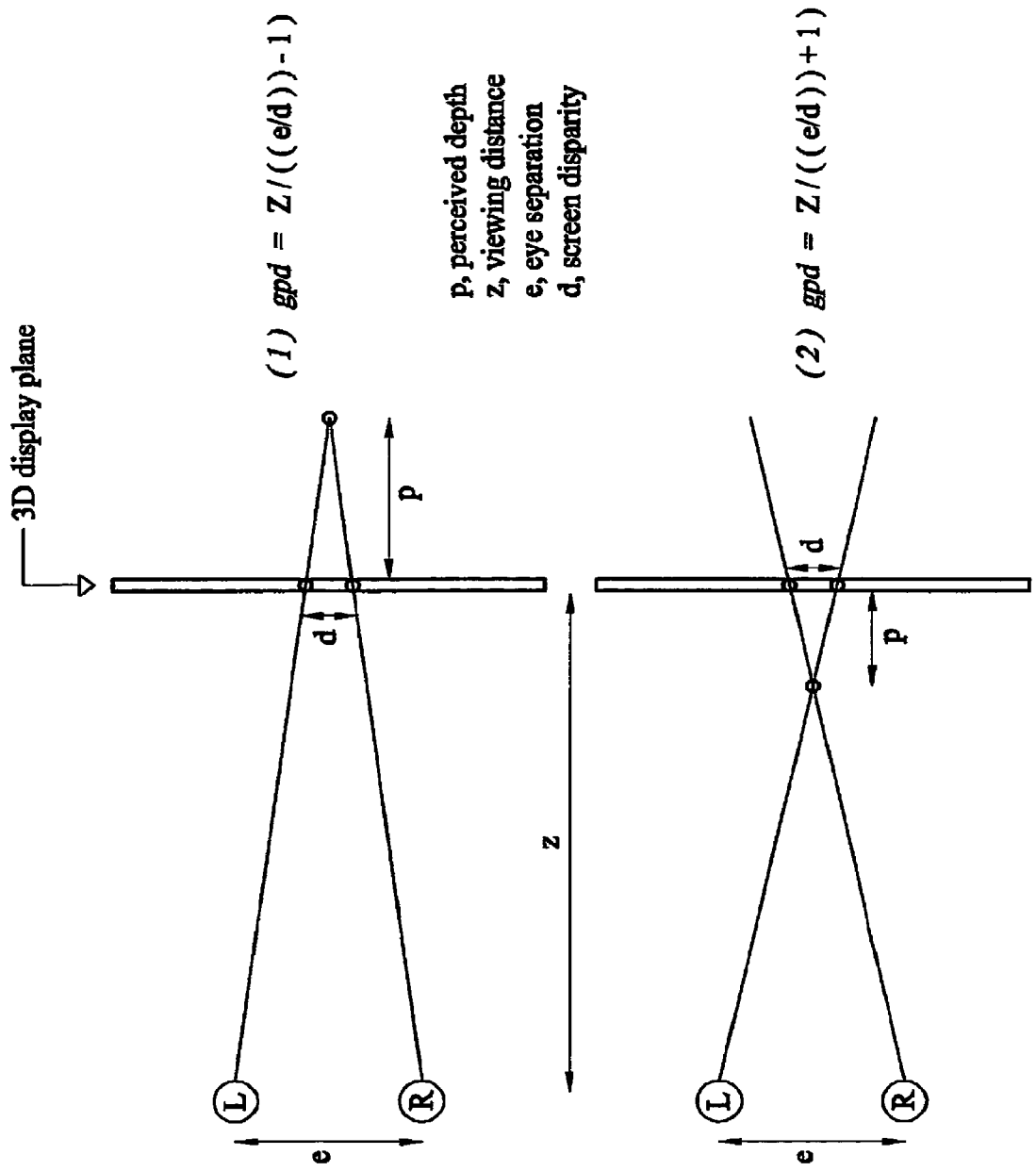
FIG. 4 is a schematic view demonstrating the calculation of geometric perceived depth.

Below is set out an example of an algorithm which may be used to implement the present invention. The algorithm makes use of geometric perceived depth (gpd) which is a common approximation used to provide an indication of the viewer's actual perceived depth and is used as the basis for determining the various viewing positions. The basis for calculating geometric perceived depth is shown in FIG. 4 for positive perceived depths (behind the display plane) and negative perceived depths (in front of the perceived plane). In the following calculation a geometric perceived depth of 55 millimetres in front of and behind the display's plane of the stereoscopic display is assumed.

The following algorithm is presented in relation to two distinct geometries, the geometry defining the relationship between the viewer and the display and the geometry of the scene and camera. The three-region algorithm maps the defined regions, near region, region of interest and far region in scene depth onto corresponding defined ranges of geometric perceived depth. This mapping is required to meet the constraint that points on the region boundaries are projected to coincident positions, and hence depth, in the image pair whichever region they are considered to belong to. The algorithm implements perceptive projection as a piecewise continuous function of scene depth and uses a different perspective projection (different stereo cameras) to capture each of the three regions.

Figure 5:
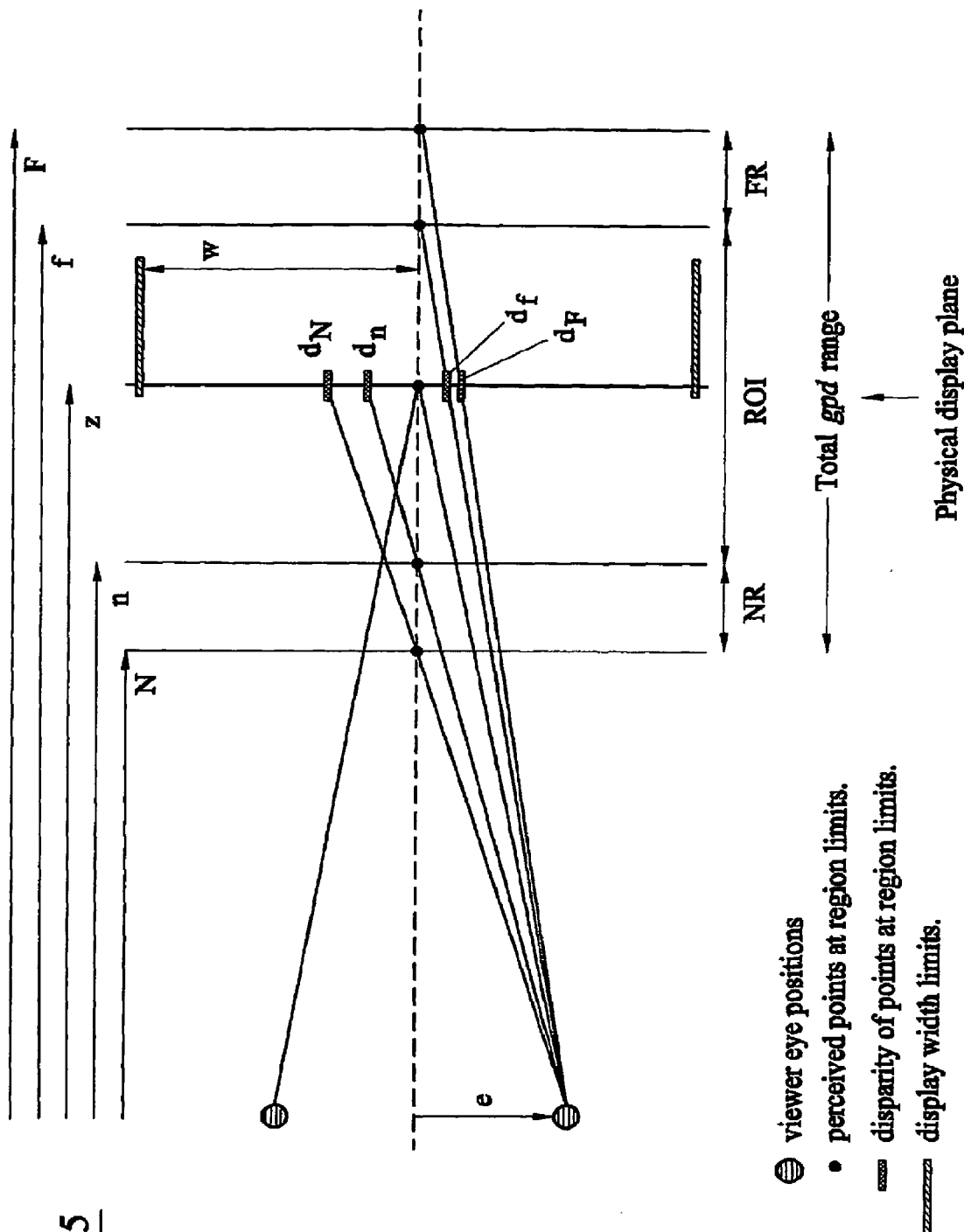
FIG. 5 is a schematic view showing the geometry of the total perceived depth range as split into near region, region of interest and far region of an embodiment of the present invention.

The geometry of display viewing is illustrated in FIG. 5. The viewer's half eye separation is given by e, the screen plane is at distance z from the viewer and the half screen width is w. The total working geometric perceived depth range is between the planes at distances N and F from the viewer. The total geometric perceived depth range is divided into a near range, near region [N, n], a region of interest range, region of interest [n, f], and a far range, far region [f, F], by planes defined at distances n and f from the viewer.

The half screen disparities of points lying on the display viewing centre line for the planes at distances N, n, f, F are given by $d_N$, $d_n$, $d_f$ and $d_F$ respectively. It should be noted that in each case just the half disparity (the different view present to each eye, shown in the figures as ray trace lines) for one view is shown with the matching half from the other view omitted for clarity.

The geometry of the scene and camera is illustrated in FIG. 6. It is assumed that the image creator has positioned a single camera, at the monoscopic camera position, that frames the required view of the scene. The total depth range in the scene to be captured is [N', F'] and this is divided into the near [N', n'], region of interest [n', f'] and far [f', F'] regions by the planes at distances n' and f' from the viewer. These regions will be mapped to the defined ranges of geometric perceived depth on the target display.

In single region methods a single stereo camera separation a' is calculated to position the camera to take the left and right images. In the three-region approach three camera separations are required one each for the near region, region of interest and far regions. The calculations to determine these are described as follows.

The region of interest (ROI) mapping uses essentially the same approach as that set out in published patent application EP1089573 and in "Controlling perceived in stereoscopic images" (in *Stereoscopic displays and virtual reality systems VIII, precedings of SPIE 4297A*, 2001, the disclosures of which are incorporated herewith. However, it differs in some of the measurements used for clarity.

The aim is to map the region of depth in the scene defined as the region of interest onto the matching region of geometric perceived depth identified for the target display. As in the original method the display is represented in the scene by a virtual display plane. This allows the scene depth to be mapped onto disparities in the virtual display plane separately from the physical disparities on the target display.

Considering the geometry of the display space in FIG. 5 similar triangles can be used to derive that the following relationships hold:

$$d_n = \frac{e(z-n)}{n} \tag{1}$$

$$d_f = \frac{e(f-z)}{f} \tag{2}$$

Considering the geometry in the scene in FIG. 6 we can also derive by similar triangles that the following relationships hold:

$$d'_n = \frac{a'(z'-n')}{n'} \tag{3}$$

$$d'_f = \frac{a'(f'-z')}{f'} \tag{4}$$

The link between these quantities is that the ratio of the disparities remains the same between the display and the virtual display in the scene. Intuitively this is the case because the link between the scene and the display is the captured image which is the same except for a scale factor between the virtual display in scene space and the physical display. The ratio is:

$$r = \frac{d_n}{d_f} = \frac{d'_n}{d'_f} \qquad (5)$$

Since e, n, f and z are given it is possible to calculate the value of r. However, the distance to the virtual screen plane z' and the half camera separation a', which is of particular interest, are not known. These expressions can be derived by substituting (3) and (4) into (5) as below:

$$r = \frac{f'(z'-n')}{n'(f'-z')} \qquad (6)$$

which can be rearranged to give an expression for z':

$$z' = \frac{f'n' + f'n'r}{f' + n'r} \qquad (7)$$

The virtual screen width w' can now be found using $t_m'$ the monoscopic camera field of view.

$$w' = z' \tan\left(\frac{t'_m}{2}\right) \qquad (8)$$

From which the scaling, s, for disparities from the target display to the virtual screen is obtained.

$$s = \frac{w'}{w} \qquad (9)$$

The target disparity ranges on the physical screen are given and as a result the disparity ranges on the virtual screen can be calculated. Then be rearranging (3) and substituting $d_n'=sd_n$, a' can be found:

$$a' = \frac{sd_n n'}{z' - n'} \qquad (10)$$

This has provided almost all of the information needed to calculate the left and right camera positions and to generate the left and right partial images for the region of interest region with the exception of the new field of view:

$$t' = 2\arctan\left(\frac{w' + a'}{z'}\right) \qquad (11)$$

This is the field of view for a camera with a symmetric frustum and hence it is necessary to clip a proportion of pixels from the left and right edges of the left and right partial images respectively. This ensures that points projecting zero disparity onto the virtual screen plane will also have zero disparity when displayed on the physical screen plane. The proportion of pixels to crop is given by:

$$c' = \frac{a'}{w' + a'} \qquad (12)$$

Figure 7:
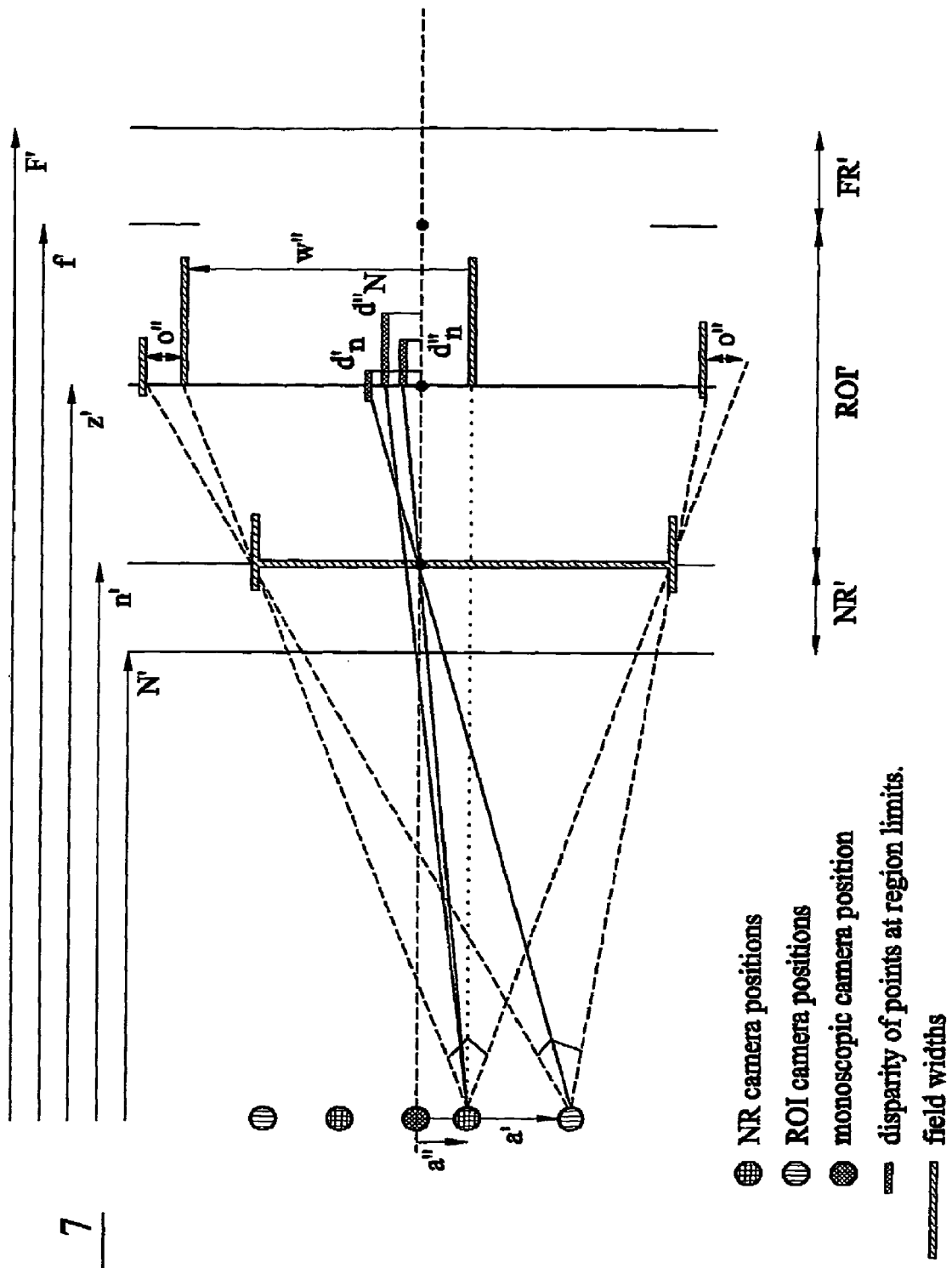
FIG. 7 is a schematic view of the geometry of the present invention showing the variables related to the near region image generation.

For the near region (NR) the actual scene depth in [N', n] is mapped to the geometric perceived depth [N, n] using the same image plane used for the region of interest mapping, as shown in FIG. 7.

It is necessary to ensure that points on the plane at n' map to the same position in the final image whether they are mapped by the region of interest step or the near region step. This can be considered as a constraint that the field width of the region of interest camera and the near region camera be the same in the plane at distance n' from the camera location. This will result in a piecewise continuous representation of stereoscopic depth which meets at region boundaries but may not be smoothly continuous.

For the near region mapping a new half camera separation a" is calculated along with a symmetric field of view and the associated image cropping. Additionally it is necessary to calculate an offset adjustment o" to shift the near region disparity range to be continuous with the disparity range for the region of interest.

It is first considered that the disparity on the virtual screen plane of a point on the planes at the near region limits of N' and n' when projected from a camera at our new near region camera position a".

The virtual screen disparity of a point on the far limit of the near region at n' is given by:

$$d_n'' = \frac{a''(z' - n')}{n'} \qquad (13)$$

The virtual screen disparity of a point on the near limit of the near region of N' is given by:

$$d_N'' = \frac{a''(z' - N')}{N'} \qquad (14)$$

It is noted that $d_N''-d_n''=s(d_N-d_n)$ since $[d_N, d_n]$ is defined to be the target disparity range for the near region depth and hence, using equations (13) and (14), a" is found to be:

$$a'' = \frac{s(d_N - d_n)}{\left(\frac{z'-N'}{N'}\right) - \left(\frac{z'-n'}{n'}\right)} \qquad (15)$$

It is now found that the offset correction to the disparity on the virtual screen so that the near region disparity is continuous with the region of interest region disparity in the virtual screen planes is:

$$o'' = d_n' - d_n'' \qquad (16)$$

where d"n is given by (13). Equation (16) may be derived by inspection or by considering application of the intercept theorem to the relevant geometry.

The field of view for the near region camera can now be calculated if the half field width w" in the virtual screen plane is known. This can be found as below:

$$w''=w'-o''+a'',\ o''<a''\ w''=w'-a''+o'',\ o''\geq a'' \qquad (17)$$

The symmetric field of view for the left and right near region cameras is then:

$$t'' = 2a\tan\left(\frac{w''}{z'}\right) \qquad (18)$$

There is a need to crop a proportion of pixels, c", from the resulting images where $$c'' = \frac{a'' - o''}{w''}, o'' < a'' \qquad (19)$$

$$c'' = \frac{o'' - a''}{w''}, o'' >= a''$$

if o"<a" then pixels are cropped from the left of the left image and the right of the right image while if o">=a" then pixels are cropped from the right of the left image and left of the right image.

As a result this has produced the new camera parameters and image adjustments needed to render the near region partial images for the left and right views. While the projection of the near region and region of interest regions will differ in order to map depth differently from scene depth to available geometric perceived depth for each region this will ensure that the depth effect will be piecewise continuous at the region boundary.

Figure 8:
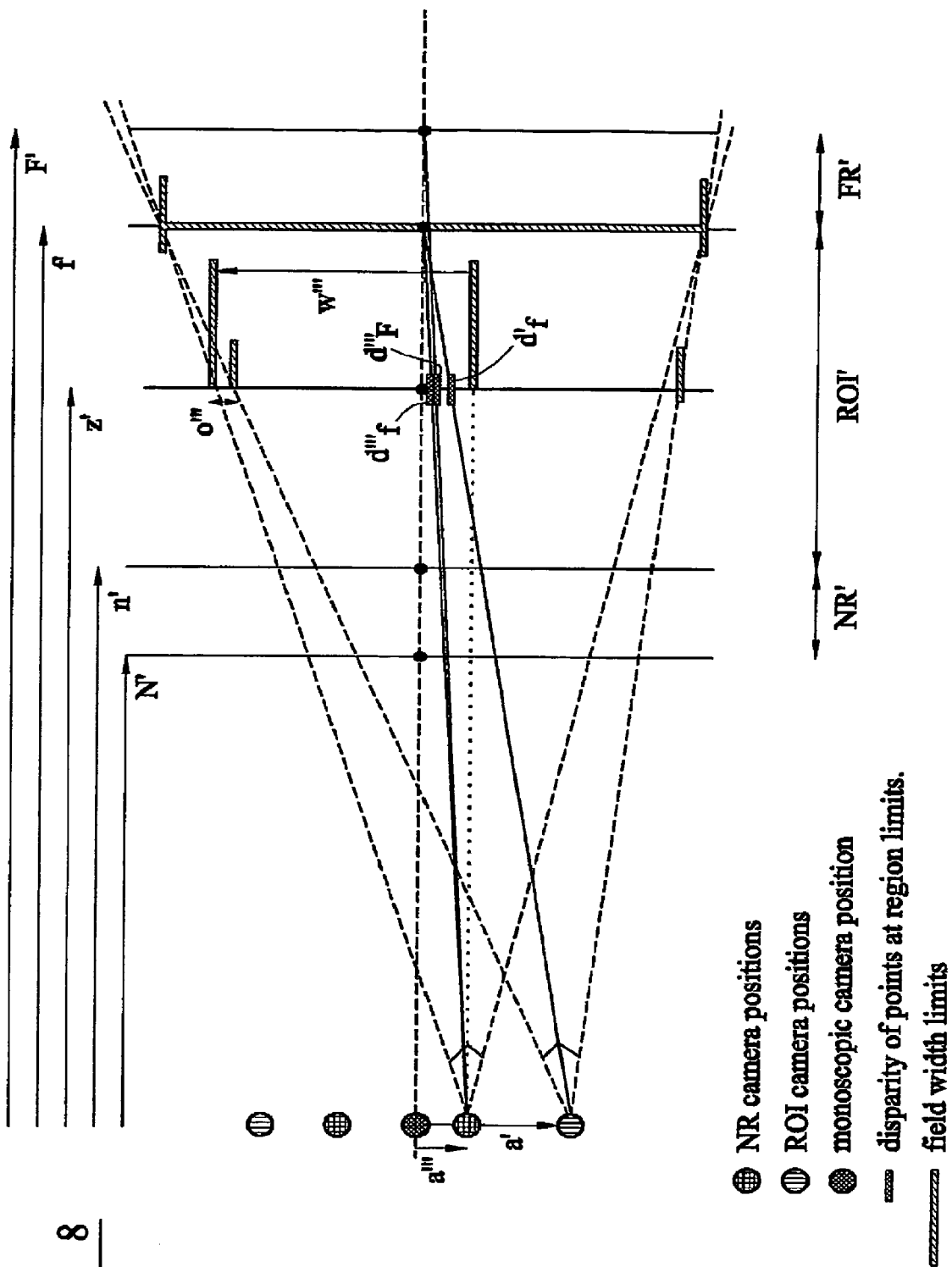
FIG. 8 is a schematic view of the geometry of the present invention showing the variables related to the far region image generation.

For the far region (FR) it is necessary to map the scene depth in [f', F'] to the geometric perceived depth range [f, F] rendering onto the same image plane used for the region of interest mapping, as shown in FIG. 8. The method is directly analogous to the near region algorithm described above and is derived in a similar manner.

As for the near region mapping it is necessary to ensure that points on the plane at f' map to the same position in the final image whether they are mapped by the region of interest step or the far region step. We can consider this as a constraint that the far region and region of interest cameras have the same field width in the plane f'.

A new camera separation a''' is determined that will map [f', F'] to [f, F], calculating the symmetric field of view, associated cropping and finally calculating the offset needed to adjust the disparity range of the far region to be piecewise continuous with that of the far limit of the region of interest disparity range.

Firstly the disparity on the virtual screen plane of a point on each of the planes at the far region limits of f' and F' when projected from a camera at our new far region camera position a''' is determined as below.

The virtual screen disparity of a point on the near limit of the far region at f' is given by:

$$d_{f'}''' = \frac{a'''(f'-z')}{f'} \qquad (20)$$

The virtual screen disparity of a point on the far limit of the far region on the plane F' is given by:

$$d_{F'}''' = \frac{a'''(F'-z')}{F'} \qquad (21)$$

It is noted that $d_F'''-d_f'''=s(d_F-d_f)$ by definition, since $[d_f, d_F]$ is given as the target disparity range. Hence from (20) and (21) a''' is found to be:

$$a''' = \frac{s(d_F - d_f)}{\left(\frac{F'-Z'}{f'}\right) - \left(\frac{f'-z'}{f'}\right)} \qquad (22)$$

It is also necessary to calculate the correction to the disparity on the virtual screen so that the far region is continuous with the region of interest:

$$o'''=d_f'-d_f''' \qquad (23)$$

where $d_f'''$ is given by (20). Equation (23) may be derived by inspection or by application of the intercept theorem to the relevant geometry.

The field of view for the far region camera location can be calculated if the field width w''' is known.

$$w'''=w'+o'''+a''' \qquad (24)$$

The symmetric field of view for the far region camera is then $$t''' = 2a\tan\left(\frac{w'''}{z'}\right) \qquad (25)$$

There is then the need to adjust the zero disparity plane by cropping a proportion of pixels from the left of the left image and the right of the right image as below:

$$c''' = \frac{a''' + o'''}{w'''} \qquad (26)$$

There is therefore produced the new camera parameters and image adjustments needed to render the far region partial images for the left and right views. While the projection of the far region and region of interest will differ in order to map depth differently from scene to display in each region it has been ensured that the depth effect will be piecewise continuous at the region boundary.

Figure 9A:
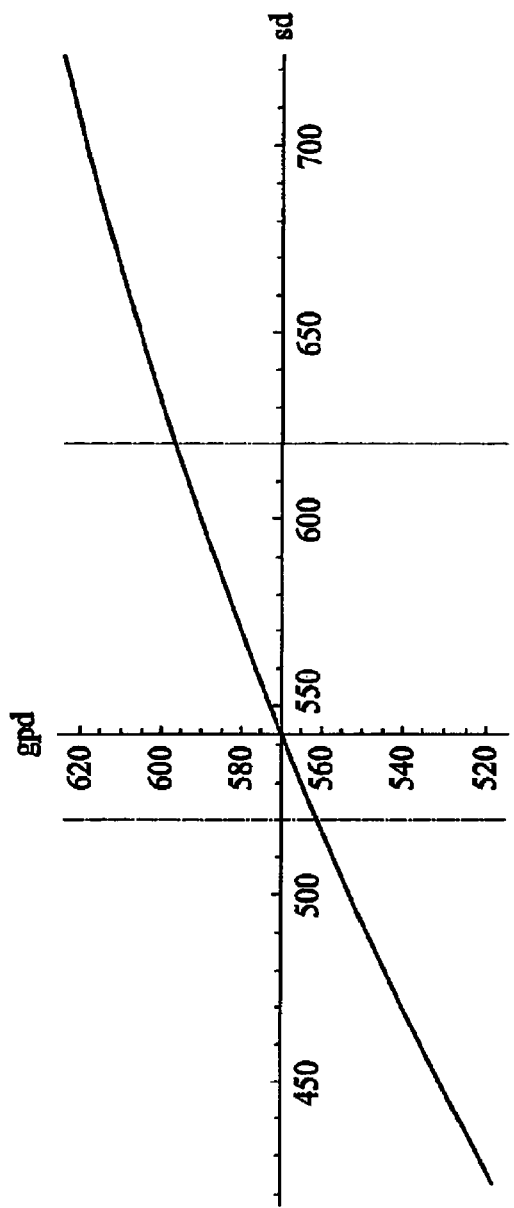
FIG. 9 is a pair of graphs with actual scene depth plotted against geometric perceived depth for the prior art in FIG. 9a and an embodiment of the present invention in FIG. 9b.
Figure 9B:
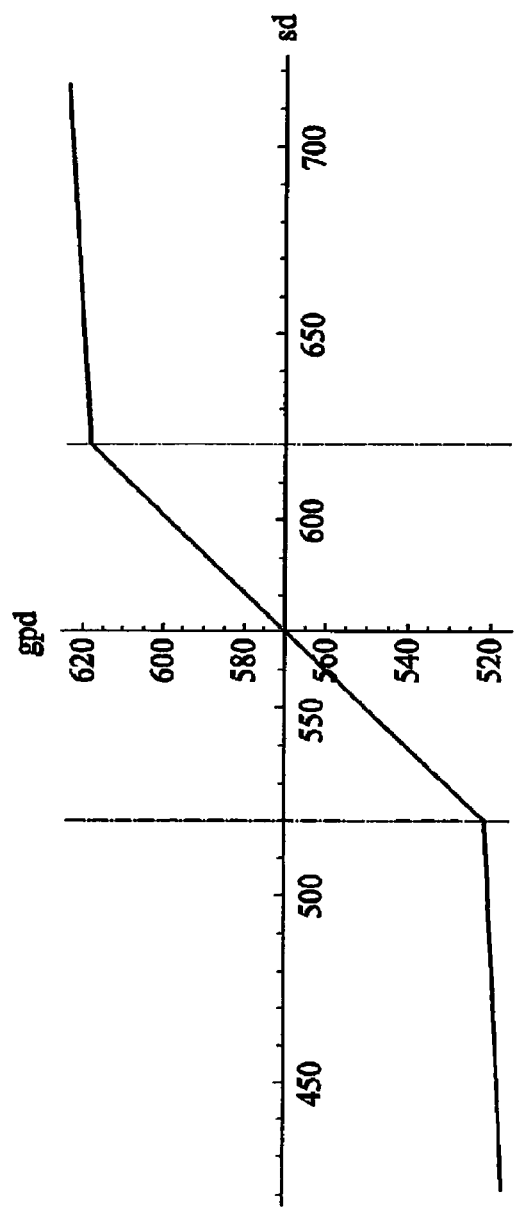
Figure 10:
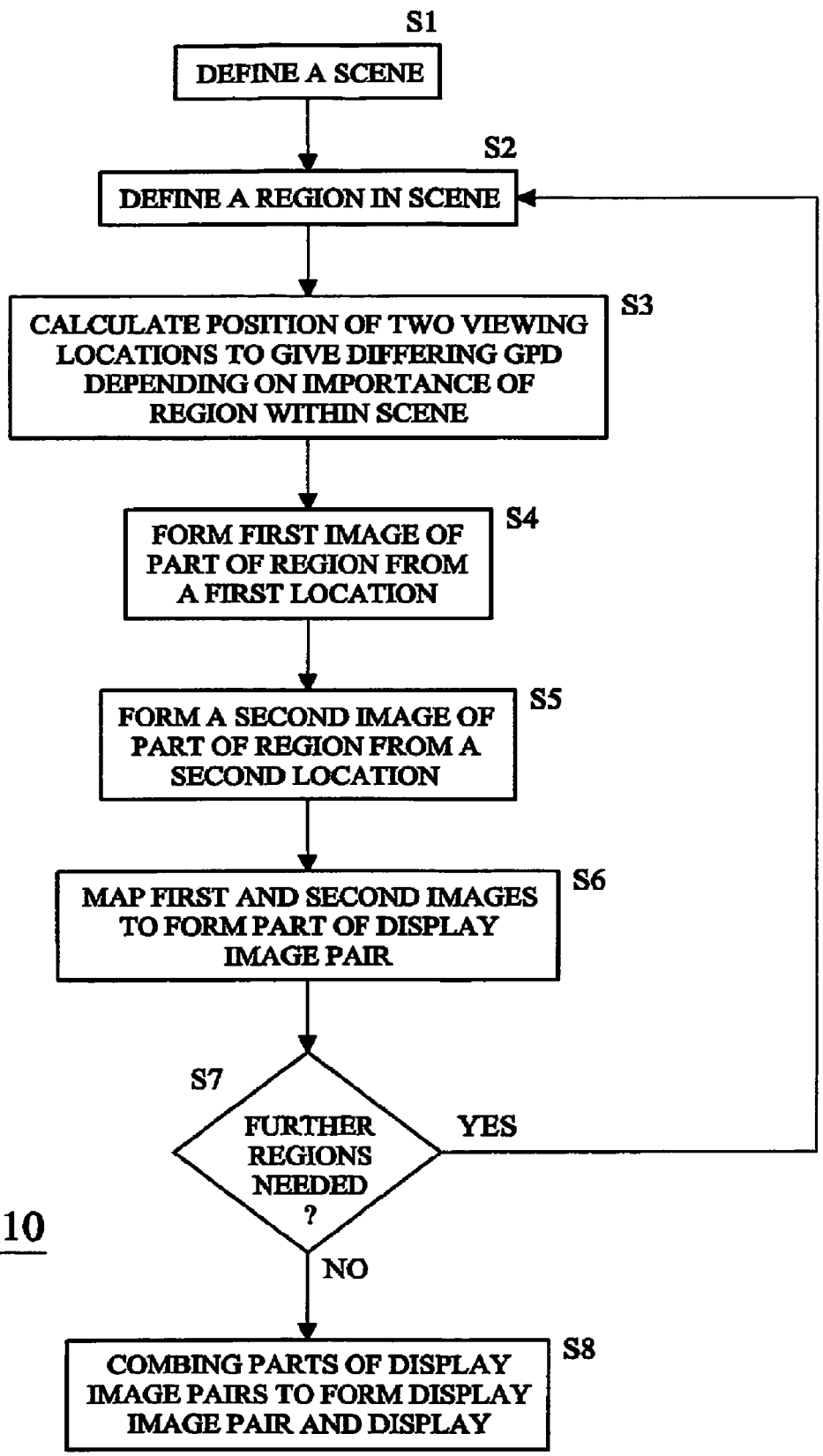
FIG. 10 is a flow diagram representing the steps of the method of the present invention.

A comparison of the results of the three-region mapping algorithm with an existing single region algorithm is shown in FIG. 9. FIG. 9a shows how the single range mapping compresses the region of interest along with the rest of the scene as a whole into the available geometric perceived depth thus distorting the depth of objects shown throughout. FIG. 9b shows how the three-region algorithm is able to distribute available geometric perceived depth preferentially to the region of interest, in this case the region of interest is given a one-to-one representation at the expense of further compression of geometric perceived depth in the near and far regions.

As well as preferentially allocating available perceived depth to the region of interest the new algorithm has the benefit of being able to fix the geometric perceived depth even if the total depth range in the scene is changing. This is of significant benefit when, for example in a computer game, moving a game character around a scene with varying depth range. The depth representation of the game character can now be fixed where the previous single range mapping the character's depth representation will vary depending on the total depth scene depth visible from the current viewpoint.

The present invention may also be implemented in scientific and medical imaging. For example, in astronomical modelling a galaxy which has been scaled to be presented on a 3-D display device and the nearest and furthest regions of the displayed galaxy can be distorted in order to maintain the geometric perceived depth of the region of interest. Similarly where medical devices utilise 3-D display devices, for example in remote controlled keyhole surgery, it is important that the geometric perceived depth of the region of interest, the region in which the surgery is taking place, is not distorted. This method allows the entire scene to be displayed without allowing distortion of the region in which the surgery is taking place.

It will be appreciated by persons skilled in the art that the above embodiments have been described by way of example only and not in any limitative sense, and that various alterations and modifications are possible without departure from the scope of the invention as defined by the appended claims. For example, it is possible that more than three distinct regions could be defined so as to produce a smoother transition from the near and far regions into the regions of interest. This would result in the graph shown in FIG. 9b being a smoothed S-type curve. By providing an increased number of regions with differing geometric perceived depths and therefore a smooth S-type curve shown in FIG. 9b, this smooths the transition at the boundaries of the regions. For example, if a linear element were displayed extending from the far region through the region of interest and into the near region, if a single geometric perceived depth were used in each of these regions, the displayed device would appear to have two angles located at the boundaries of the regions.

Furthermore, for displays which are head tracked, so that the stereo view can be seen over a range of observer positions, the monoscopic view position may be offset from the center line of the display. However in this case the method is essentially the same as that shown for the central viewpoint but uses an offset geometry.

Where multi-view displays are used to show a number of simultaneous views (e.g. the Stereographics Synthagram can show nine simultaneous views) the observer can move around and see left/right pairs from the nine view images over a wide range of spatial positions. This provides a stereo effect over an extended range of observer positions without requiring head tracking. Image generation for these displays requires the use of multiple (for example nine) camera viewpoints to generate multiple images one for each view on the display. For these displays the method is essentially the same, except that instead of generating a stereo image pair the method generates multiple images, for example nine. This is done by the generation of nine viewing locations, the formation of nine images of the current region in the scene, and finally the combination of the nine sets of partial images from each region to form the nine images ready for display on a physical multi-view display. As well as multi-view displays there are printing and photographic techniques for creating multi-view hardcopies, where a lenticular optical element is placed over a suitable combination of the multiple views on photograph or printed medium. Examples of this stereo viewing technique may require 24 images from 24 viewpoints.

What is claimed is:

1. A method for generating a stereoscopic image of a scene having a first and a second object, the first object having a first predetermined depth in the scene and the second object having a second predetermined depth in the scene, the method comprising:
    capturing a left and right image of the first object using a first camera separation, wherein the first camera separation is based on a first perceived depth of the first object in a region of interest of the stereoscopic image of the scene, and wherein a ratio of the first perceived depth to the first predetermined depth is set at a desired viewing ratio;
    capturing a left and right image of the second object using a second camera separation, wherein the second camera separation is based on a second perceived depth of the second object in a second region of the stereoscopic image of the scene;
    generating a composite left image from the left image of the first object and the left image of the second object by overlaying the left image of the first object on top of the left image of the second object;
    generating a composite right image from the right image of the first object and the right image of the second object by overlaying the right image of the first object on top of the right image of the second object; and
    providing the composite left image and composite right image.

2. The method of claim 1, wherein the second region is substantially non-overlapping with the region of interest.

3. The method of claim 1, wherein the region of interest comprises a perceived depth range in the stereoscopic image of the scene, the perceived depth range maps to a depth range in the scene.

4. The method of claim 1, wherein the scene is a real world representation.

5. The method of claim 1, wherein the scene is a synthetic representation.

6. The method of claim 1, wherein the region of interest is defined by a first volume in space between a first plane at a first distance from a viewer and a second plane at a second distance from the viewer.

7. The method of claim 6, wherein the second region is defined by a second volume in space between a third plane at a third distance from the viewer and a fourth plane at a fourth distance from the viewer.

8. The method of claim 1, wherein the region of interest comprises one of a near region and a far region.

9. The method of claim 1, wherein the ratio of the perceived depth of the second object to the predetermined depth of the second object is distorted.

10. A method for generating a stereoscopic image of a scene having a first, a second, and a third object, the first object having a first predetermined depth in the scene, the second object having a second predetermined depth in the scene, and the third object having a third predetermined depth in the scene, the method comprising:
    capturing a left and right image of the first object using a first camera separation, wherein the first camera separation is based on a first perceived depth of the first object in a region of interest of the stereoscopic image of the scene, and wherein a ratio of the first perceived depth to the first predetermined depth is set at a desired viewing ratio;
    capturing a left and right image of the second object using a second camera separation, wherein the second camera separation is based on a second perceived depth of the second object in a second region of the stereoscopic image of the scene;
    capturing a left and right image of the third object using a third camera separation, wherein the third camera separation is based on a third perceived depth of the third object in a third region of the stereoscopic image of the scene;
    generating a composite left image from the left image of the first object, the left image of the second object, and the left image of the third object by overlaying the left image of the first object on top of the left image of the second object on top of the left image of the third object;

generating a composite right image from the right image of the first object, the right image of the second object, and the right image of the third object by overlaying the right image of the first object on top of the right image of the second object on top of the right image of the third object; and providing the composite left image and composite right image.

11. The method of claim 10, wherein the region of interest comprises a middle region in the stereoscopic image of the scene mapping to a middle region of the scene, the second region comprises a near region in the stereoscopic image of the scene mapping to a near region in the scene, and the third region comprises a far region in the stereoscopic image of the scene mapping to a far region in the scene.

12. The method of claim 10, wherein the region of interest comprises one of a near region, a far region, and a middle region.

13. An apparatus for generating a stereoscopic image of a scene having a first and a second object, the first object having a first predetermined depth in the scene and the second object having a second predetermined depth in the scene, the apparatus comprising:

an object capturing device for capturing a left and right image of the first object using a first camera separation, wherein the first camera separation is based on a first perceived depth of the first object in a region of interest of the stereoscopic image of the scene, and wherein a ratio of the first perceived depth to the first predetermined depth is set at a desired viewing ratio; and for capturing a left and right image of the second object using a second camera separation, wherein the second camera separation is based on a second perceived depth of the second object in a second region of the stereoscopic image of the scene;

an object generating device for generating a composite left image from the left image of the first object and the left image of the second object by overlaying the left image of the first object on top of the left image of the second object; and for generating a composite right image from the right image of the first object and the right image of the second object by overlaying the right image of the first object on top of the right image of the second object; and an image providing device for providing the composite left image and composite right image.

14. The apparatus of claim 13, wherein the second region is substantially non-overlapping with the region of interest.

15. The apparatus of claim 13, wherein the region of interest comprises a perceived depth range in the stereoscopic image of the scene, the perceived depth range mapping to a depth range in the scene.

16. The apparatus of claim 13, wherein the scene is a real world representation.

17. The apparatus of claim 13, wherein the scene is a synthetic representation.

18. The apparatus of claim 13, the region of interest is defined by a first volume in space between a first plane at a first distance from a viewer and a second plane at a second distance from the viewer.

19. The apparatus of claim 18, wherein the second region is defined by a second volume in space between a third plane at a third distance from the viewer and a fourth plane at a fourth distance from the viewer.

20. The apparatus of claim 13, wherein the region of interest comprises one of a near region and a far region.

21. The apparatus of claim 13, wherein the ratio of the perceived depth of the second object to the predetermined depth of the second object is distorted.

22. An apparatus for generating a stereoscopic image of a scene having a first, a second, and a third object, the first object having a first predetermined depth in the scene, the second object having a second predetermined depth in the scene, and the third object having a third predetermined depth in the scene, the apparatus comprising:

an object capturing device for capturing a left and right image of the first object using a first camera separation, wherein the first camera separation is based on a first perceived depth of the first object in a region of interest of the stereoscopic image of the scene, and wherein a ratio of the first perceived depth to the first predetermined depth is set at a desired viewing ratio; and for capturing a left and right image of the second object using a second camera separation, wherein the second camera separation is based on a second perceived depth of the second object in a second region of the stereoscopic image of the scene; and for capturing a left and right image of the third object using a third camera separation, wherein the third camera separation is based on a third perceived depth of the third object in a third region of the stereoscopic image of the scene;

an object generating device for generating a composite left image from the left image of the first object, the left image of the second object, and left image of the third object by overlaying the left image of the first object on top of the left image of the second object on top of the left image of the third object; and for generating a composite right image from the right image of the first object, the right image of the second object, and the right image of the third object by overlaying the right image of the first object on top of the right image of the second object on top of the right image of the third object; and an image providing device for providing the composite left image and composite right image.

23. The apparatus of claim 22, wherein the region of interest comprises a middle region in the stereoscopic image of the scene mapping to a middle region of the scene, the second region comprises a near region in the stereoscopic image of the scene mapping to a near region in the scene, and the third region comprises a far region in the stereoscopic image of the scene mapping to a far region in the scene.

24. The apparatus of claim 22, wherein the region of interest comprises one of a near region, a far region, and a middle region.

25. The method of claim 1, wherein the first object is a near object and wherein the second object is a far object, and wherein when the composite images are generated, the images are overlaid such that portions of the far object that are not obscured by the near object can be seen by a viewer.

26. The method of claim 1, wherein the first object is a near object and wherein the second object is a far object, and wherein when the composite images are generated, the images are overlaid such that portions of the left image of the first object and right image of the second object are not used such that portions of the far object that are not obscured by the near object can be seen by a viewer.

27. The method of claim 1, further comprising defining the region of interest by bounds of the first object.

28. The method of claim 1, wherein the first perceived depth of the first object comprises the depth dimension of the first object.

29. The method of claim 1, further comprising defining the second region by the second object and other objects in the scene.

* * * * *